United States Patent [19]

Mazur et al.

[11] Patent Number: 5,454,591
[45] Date of Patent: Oct. 3, 1995

[54] METHOD AND APPARATUS FOR SENSING A REARWARD FACING CHILD RESTRAINING SEAT

[75] Inventors: Joseph F. Mazur, Washington; Brian K. Blackburn, Rochester; Scott B. Gentry, Romeo, all of Mich.

[73] Assignee: TRW Vehicle Safety Systems Inc., Lyndhurst, Ohio

[21] Appl. No.: 263,191

[22] Filed: Jun. 21, 1994

Related U.S. Application Data

[63] Continuation-in-part of Ser. No. 147,682, Mar. 11, 1993.
[51] Int. Cl.⁶ ................................................. B60R 21/32
[52] U.S. Cl. ...................... 280/735; 280/730.1; 180/273
[58] Field of Search .......................... 280/735, 730 R; 180/273; 340/436, 903; 307/9.1, 10.1; 364/424.05

[56] References Cited

U.S. PATENT DOCUMENTS

| | | | |
|---|---|---|---|
| 3,172,684 | 3/1965 | Isaac | 280/235 |
| 3,340,523 | 9/1967 | Whitman | 340/218 |
| 3,992,028 | 11/1976 | Abe et al. | 280/728 R |
| 4,004,234 | 1/1977 | Juvinall | 328/5 |
| 4,063,230 | 12/1977 | Purinton et al. | 340/280 |
| 4,336,531 | 6/1982 | Kincaid | 340/568 |
| 4,502,042 | 2/1985 | Wuhrl et al. | 340/568 |
| 4,796,013 | 1/1989 | Yasuda et al. | 340/562 |
| 4,804,859 | 2/1989 | Swart | 307/105 B |
| 4,812,811 | 3/1989 | Asbrink et al. | 340/571 |
| 4,973,944 | 11/1990 | Maletta | 340/568 |
| 5,071,160 | 12/1991 | White et al. | 280/725 |
| 5,074,583 | 12/1991 | Fujita et al. | 280/735 |
| 5,081,446 | 1/1992 | Gill et al. | 340/572 |
| 5,118,134 | 6/1992 | Mattes et al. | 280/235 |
| 5,161,820 | 11/1992 | Vollmer | 280/730 |
| 5,232,243 | 8/1993 | Blackburn et al. | 280/732 |
| 5,260,684 | 11/1993 | Metzmaker | 340/457.1 |

FOREIGN PATENT DOCUMENTS

| | | | |
|---|---|---|---|
| 0458102 | 11/1991 | European Pat. Off. | |
| 3802159 | 8/1989 | Germany | 280/735 |
| 4212018 | 10/1992 | Germany | |
| 4228624 | 10/1992 | Germany | |

OTHER PUBLICATIONS

Research Disclosure #34457 "Air Bag Inhibitor for use with infant seat" Dec. 1992.
An anonymous disclosure entitled "Air Bag Inhibitor for Use With Infant Seat", dated Dec. 1992.
Automotive Occupant Sensor by Gencorp AeroJet.
Research Disclosure, Nov. 1993, No. 355, Disclosure 35519.

*Primary Examiner*—Mitchell J. Hill
*Assistant Examiner*—Christopher P. Ellis
*Attorney, Agent, or Firm*—Tarolli, Sundheim & Covell

[57] ABSTRACT

An apparatus (20) for preventing actuation of an air bag restraining device (25) of a vehicle includes a weight sensor (36), a distance sensor (42), and a seat belt payout sensor (66). A controller (22) is operatively connected to the sensors (36, 42, 66) and to the air bag restraining device (25). The controller (22) prevents actuation of the air bag when the sensors (36, 42, 66) sense a rearward facing child seat (46) on the occupant seat (40) by sensing a weight of an object less than a predetermined amount, a distance to an object on the seat (40) less than a predetermined amount, and a seat belt payout of greater than a predetermined amount.

20 Claims, 3 Drawing Sheets

METHOD AND APPARATUS FOR SENSING A REARWARD FACING CHILD RESTRAINING SEAT

CROSS-REFERENCE TO RELATED APPLICATION

This is a continuation-in-part of U.S. patent application Ser. No. 147,682, filed Nov. 3, 1993, pending to Blackburn, et al., for "Method and Apparatus for Sensing a Rearward Facing Child Seat" and assigned to TRW Vehicle Safety Systems Inc.

TECHNICAL FIELD

The present invention is directed to a vehicle occupant restraint system. The invention is specifically directed to a method and apparatus for sensing a rearward facing child restraining seat and, in response to sensing a rearward facing child restraining seat, preventing deployment of an air bag restraint.

BACKGROUND OF THE INVENTION

Air bag restraint systems for vehicles are well known in the art. It is also known to prevent deployment of an air bag during a vehicle crash when the air bag is associated with a seat location that is unoccupied. Deployment of an air bag associated with an unoccupied seat location (typically the passenger seat location) during a vehicle crash adds unnecessary expense to repair of the vehicle.

To prevent such unnecessary deployment of an air bag at an unoccupied seat location, sensors are provided to detect the presence of an occupant on the vehicle seat. These sensors include pressure sensing switches located in the seat cushion or infrared or ultrasonic sensors located in the vehicle dashboard or instrument panel. If no occupant is detected as being present on the seat, deployment of an associated air bag during a crash condition is prevented through an appropriate control arrangement.

It is also desirable to prevent actuation of an air bag restraint system when a child restraining seat is secured and positioned in a rearward facing orientation on an associated seat location. When a rearward facing child seat is secured to a vehicle seat, deployment of an associated air bag during a vehicle crash condition would not provide the child with additional protection since the child's head and torso would not move relative to the child seat in the direction of vehicle travel.

SUMMARY OF THE INVENTION

The present invention provides a method and apparatus for sensing presence and orientation of a child restraining seat and preventing deployment of an associated air bag during a vehicle crash condition if the rearward facing child seat is sensed as being present.

In accordance with the invention, an apparatus is provided for preventing actuation of an actuatable occupant restraining device of a vehicle. The apparatus includes presence sensing means for sensing the presence of a rearward facing child restraining seat on an occupant seat of the vehicle. The apparatus further includes confirmation sensing means for confirming the presence of the child restraining seat on the occupant seat. Control means is operatively connected to the presence sensing means, the confirmation sensing means, and the actuatable occupant restraining device for preventing actuation of the actuatable occupant restraining device when both (i) the presence sensing means senses a rearward facing child restraining seat on the occupant seat and (ii) the confirmation sensing means confirms the presence of the child restraining seat on the occupant seat.

In accordance with a preferred embodiment of the present invention, an apparatus is provided for preventing actuation of an air bag restraint when a rearward facing child restraining seat is present on an associated occupant seat location. A presence sensing means senses the presence of a rearward facing child restraining seat on the occupant seat. The presence sensing means includes a distance sensor mounted in the instrument panel for providing a signal having a value indicative of the distance between the distance sensor and an object in front of the distance sensor. The distance sensor preferably includes an ultrasonic sensor. The presence sensing means further includes a seat belt payout sensor for providing a signal indicative of the amount of seat belt extracted from a seat belt retractor. An amount of seat belt greater than a threshold amount needs to be extracted to secure a rearward facing child seat to the occupant seat. The apparatus further comprises confirmation sensing means for confirming the presence of a child restraining seat on an occupant seat of a vehicle and for providing a confirmation signal indicative thereof. Preferably, the confirmation sensing means includes a weight sensor for providing the confirmation signal when weight on the occupant seat is less than a threshold amount. Control means is operatively connected to the distance sensor, the belt payout sensor, the weight sensor, and to the actuatable occupant restraining device for preventing actuation of the actuatable occupant restraining device when both the distance sensor and belt payout sensor indicates a rearward facing child restraining seat is on the occupant seat and the weight sensor confirms that the child restraining seat is present on the occupant seat.

Also in accordance with the present invention, a method is provided for preventing actuation of an actuatable occupant restraint device of a vehicle. The method comprises the steps of sensing the presence of a child restraining seat on an associated occupant seat and confirming the presence of the child restraining seat on the occupant seat. Actuation of the actuatable occupant restraining device is prevented when the rearward facing child restraining seat is sensed as being present on the occupant seat and it is confirmed that the child restraining seat is on the occupant seat.

In accordance with a preferred embodiment of the present invention, a method is provided for preventing actuation of an air bag restraint when a rearward facing child restraining seat is present on an associated occupant seat location. The method includes the steps of sensing the distance between the vehicle instrument panel and an object on an occupant seat of a vehicle, sensing seat belt payout, and sensing if weight on the occupant seat is less than a threshold value. The method further comprises the step of preventing actuation of the actuatable occupant restraining device when the sensed distance and sensed belt payout indicate a rearward facing child restraining seat is on the occupant seat and the sensed weight confirms a child restraining seat is on the occupant seat.

BRIEF DESCRIPTION OF THE DRAWINGS

The foregoing and other features of the present invention will become apparent to those skilled in the art to which the present invention relates upon consideration of the following description of the invention with reference to the accompanying drawings, wherein.

DESCRIPTION OF PREFERRED EMBODIMENTS

Figure 1:
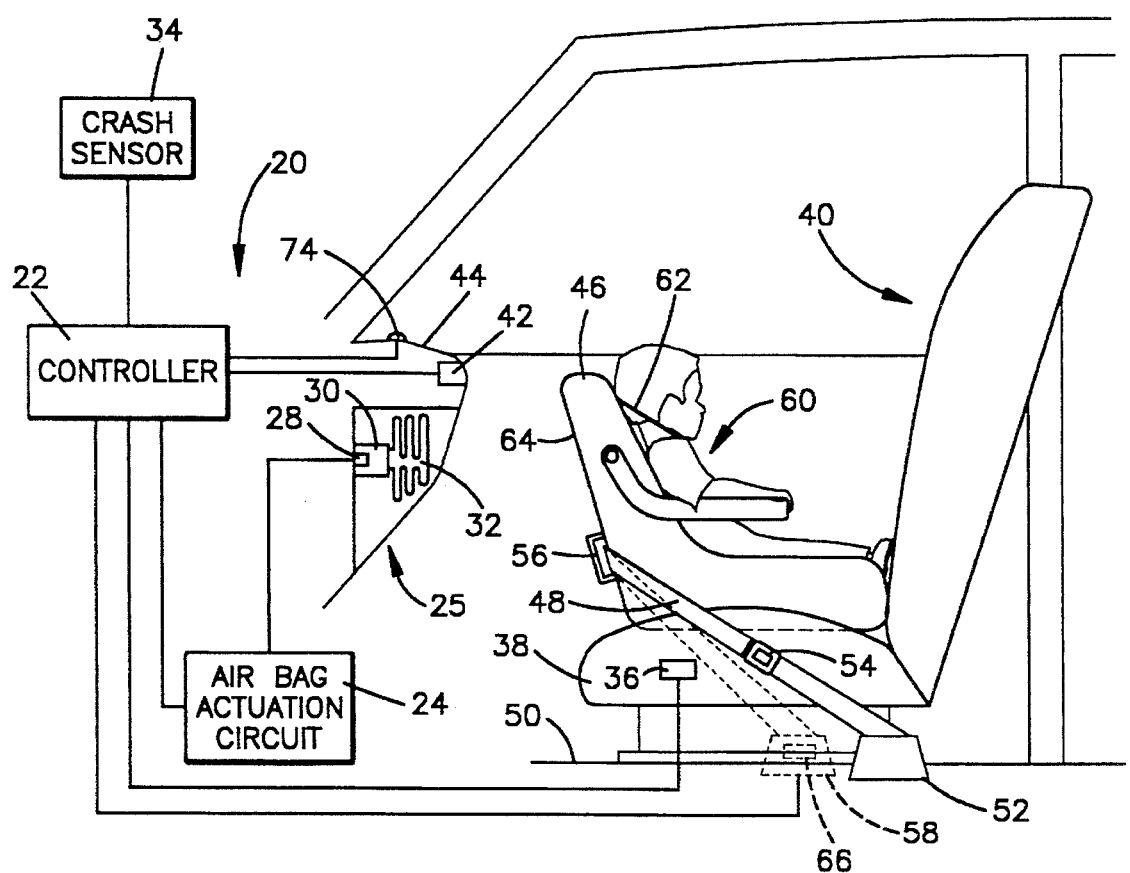
FIG. 1 is a schematic of an apparatus for controlling an air bag restraint in accordance with the present invention.
Figure 2:
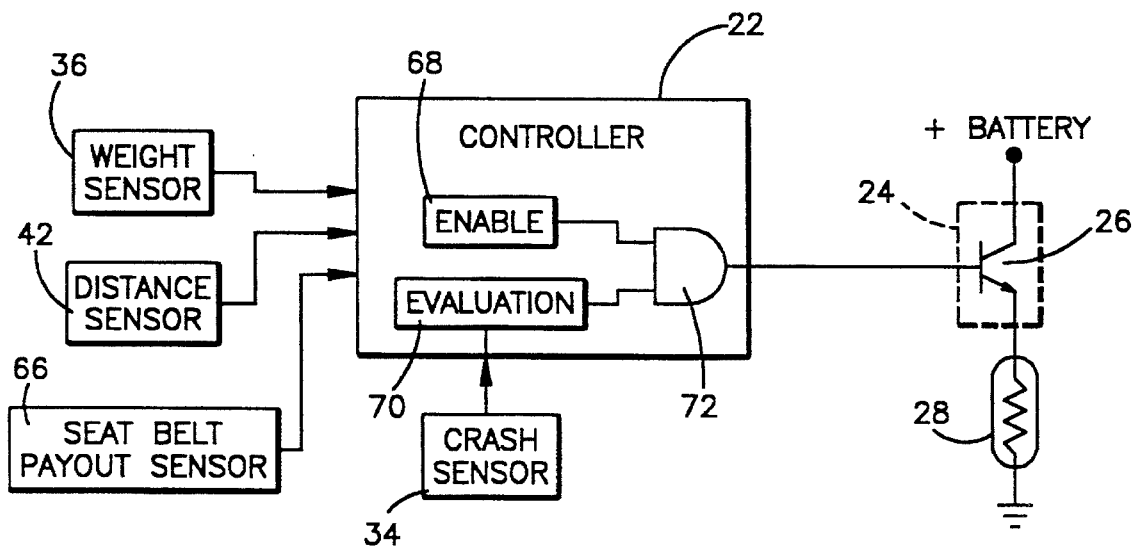
FIG. 2 is a schematic block diagram showing a portion of the circuitry of FIG. 1.

Referring to FIGS. 1 and 2, an apparatus 20, in accordance with the present invention, includes a controller 22 operatively connected to an air bag actuation circuit 24. Actuation circuit 24 is operatively coupled to an air bag assembly 25. The air bag actuation circuit 24 includes a transistor 26 that is electrically connected in series between a squib 28 and a source of electrical energy. Controller 22 is controllably connected to the base of transistor 26. When controller 22 actuates transistor 26 so as to turn the transistor "ON", a sufficient amount of electric current for a sufficient time duration passes through squib 28 to ignite the squib.

Squib 28 is operatively coupled to a source of inflation fluid 30, such as an ignitable gas generating material and/or a container of pressurized gas. The inflator 30 is operatively coupled to an air bag 32. Upon ignition of the squib 28, inflation fluid from the inflator 30 inflates air bag 32 to its operative restraining position.

The apparatus 20 further includes a crash sensor 34 operatively connected to controller 22. A weight sensor 36 is operatively mounted in a seat cushion 38 of an occupant seat 40 and is electrically connected to controller 22. The weight sensor 36 provides a signal to the controller 22 so that the controller can determine whether an object on the occupant seat 40 weighs more than a predetermined value. Weight sensor 36 may be any one of several known in the art. For example, a weight sensor of the type described in U.S. Pat. No. 5,232,243 to Blackburn et al. may be used. Alternatively, a switch which opens or closes in response to applied weight greater than the predetermined value may also be used.

A typical child restraining seat weighs approximately 10–12 pounds. A small child that would be placed in such a restraining seat in a rearward facing direction would weigh under 20 pounds. In the preferred embodiment, the predetermined threshold weight value is 40 lbs. to account for the presence of a child under 20 lbs. plus the weight of a child restraint seat weighing 10–12 lbs. plus a margin of safety. If an object on the seat cushion 38 weighs more than 40 lbs., it is assumed that the object can not be a rearward facing child seat. If the weight sensor 36 is a switch, it is arranged to provide one signal if an object weighing more than 40 lbs. is on the seat cushion 38. The weight sensor 36 provides a second signal when no object weighing more than 40 lbs. is on the seat cushion 38.

A distance sensor 42 is mounted in instrument panel/dashboard 44 of the vehicle and is electrically connected to controller 22. The distance sensor 42 provides a signal indicative of the distance between the distance sensor 42 and an object located on the occupant seat 40 in operative line with the distance sensor 42. Distance sensor 42 may be any one of several types known in the art. For example, in accordance with a preferred embodiment, an ultrasonic sensor is used. Other sensors that could be used include active or passive infrared sensors.

A child restraining seat 46 is secured to the seat 40 in a rearward facing direction with a seat belt 48 that is attached to the vehicle floor 50 on one side of the seat 40 through a mounting assembly 52 and buckle 54 as is well known in the art. The seat belt 48 passes through a belt holder 56 of the child restraining seat 46 and is secured to the vehicle floor 50 on the other side of the seat 40 through a seat belt retractor assembly 58, also well known in the art. A child 60 is secured in the child restraining seat 46 using a three-point, over-both-shoulders harness restraint 62 that is typical for child restraining seats.

When a child restraining seat 46 is secured in a rearward facing orientation on occupant seat 40, the back 64 of child restraining seat 46 is closer to instrument panel/dashboard 44 and, in turn, to the sensor 42, than when the child restraining seat 46 is in a forward facing orientation. The back portion 64 of a rearward facing child seat is typically less than 9 inches from the sensor 42. In the preferred embodiment, the distance sensor 42 provides a signal to controller 22 indicative of the sensed distance. The controller 22 determines if the distance is less than or equal to 9 in. from the distance sensor 42.

A seat belt payout sensor 66 is located in seat belt retractor 58 and is electrically connected to controller 22. Seat belt retractor 58 is attached to vehicle floor 50. Seat belt payout sensor 66 measures the length of seat belt 48 extracted from or paid out from seat belt retractor 58 and provides an electrical signal indicative of the length of seat belt 48 paid out. When a child restraining seat is secured in a rearward facing direction, a belt payout equal to or greater than a predetermined amount occurs. Therefore, if the belt payout indication is greater than the predetermined amount, it is assumed that a rearward facing child seat is present. Seat belt payout sensor 66 may be any one of several types including a potentiometer that provides an electrical signal having a value functionally related to the length of seat belt 48 extracted. A threshold on/off switch may be used which switches state when the predetermined length of seat belt 48 is extracted.

Empirical testing has indicated that approximately 36 inches of seat belt is needed to secure a rearward facing child seat on the occupant seat 40. It takes approximately 30 inches of belt to secure a forward facing child seat. Therefore, the belt payout threshold value is set internal to controller 22 at 35 inches.

Controller 22 includes both an enable function 68 and an evaluation function 70. When both functions provide a digital HIGH signal, controller 22 actuates circuit 24 to energize the squib 28.

Referring to FIGS. 1 & 2, the evaluation function 70 and the enable function 68 of controller 22 will be better appreciated. A vehicle crash sensor 34 is operatively mounted to the vehicle and electrically connected to controller 22. Crash sensor 34 may be any one of several known crash sensors, including an inertia switch or an accelerometer. In a preferred embodiment, the crash sensor is an accelerometer.

Crash sensor 34 provides an electrical signal to controller 22 indicative of the vehicle's crash acceleration. Those skilled in the art will appreciate that controller 22 may use any one of several known algorithms to analyze the accelerometer signal and, in response to the signal, control the air bag actuation circuit 24. For example, the acceleration signal may be integrated to determine a crash velocity value. If the crash velocity exceeds a predetermined crash velocity threshold value, evaluation function 70 provides a digital HIGH signal to one input of an ANDING function 72 of controller 22.

Sensors 36, 42, 66 provide electrical signals to controller 22. The electrical signals from sensors 36, 42, 66 are used by controller 22 to determine the presence of a rearward facing child seat 46 on occupant seat 40. If controller 22 determines from the sensor signals that a rearward facing child seat is present, the enable function 68 outputs a LOW signal to a second input of ANDING function 72. This LOW output from the enable function 68 disables air bag actuation circuit 24. The enable function 68 normally provides a digital HIGH signal referred to herein as the enable function's default condition.

When controller 22 receives appropriate signals from both (i) distance sensor 42 indicating the presence of a rearward facing child restraining seat on occupant seat 40, and (ii) weight sensor 36 confirming the presence of a child restraining seat on occupant seat 40, the controller decides that a rearward facing child seat is present. The controller makes this decision by comparing the measured distance and weight against associated threshold values. When the distance sensor 42 indicates that a rearward facing child restraining seat is present and the weight sensor 36 confirms the presence of a child restraining seat, the enable function 68 provides a digital LOW signal. The LOW signal from enable function 68 prevents air bag actuation circuit 24 from energizing squib 28 since the output of the ANDING function 72 will be a LOW. When the air bag system is disabled, the controller 22 provides an electric signal to an indicator 74 on the instrument panel/dashboard 44 to alert the vehicle occupants that the air bag assembly 25 is disabled.

In accordance with another embodiment of the present invention, controller 22 monitors the signal from weight sensor 36 as described above. As mentioned, seat belt payout sensor 66 provides an electrical signal to controller 22 indicating the length of seat belt 48 extracted from seat belt retractor assembly 58. Controller 22 determines whether the length of seat belt 48 extended exceeds the predetermined length threshold value which would indicate the presence of a rearward facing child restraining seat 46. When controller 22 receives signals from both (i) payout sensor 66 indicating a presence of a rearward facing child restraining seat 46 and, (ii) weight sensor 36 confirming the presence of a child restraining seat 46 on occupant seat 40, the controller decides that a rearward facing child seat is present. The controller accomplishes this by comparing measured belt payout and weight against associated limits. When the payout sensor 66 indicates that a rearward facing child restraining seat is present and the weight sensor 36 confirms the presence of a child restraining seat, the enable function 68 provides a digital LOW signal. The LOW signal from enable function 68 prevents air bag actuation circuit 24 from energizing squib 28 since the output of ANDING function 72 will be LOW. When the air bag is disabled, the controller 22 provides an electric signal to an indicator 74 mounted in the instrument panel/dashboard 44 to alert the vehicle occupants that the air bag assembly 25 is disable.

In accordance with yet another embodiment of the present invention, controller 22 monitors signals from weight sensor 36, distance sensor 42, and seat belt payout sensor 66.

When controller 22 receives appropriate signals from (i) payout sensor 66 indicating a presence of a rearward facing child seat, (ii) distance sensor 42 indicating the presence of rearward facing child restraining seat 46, and (iii) weight sensor 36 confirming the presence of a child restraining seat 46 on occupant seat 40, the controller decides that a child restraining seat is present. The controller accomplishes this by comparing measured belt payout, distance, and weight against associated limits. When the payout sensor 66 indicates that a rearward facing child seat is present and the distance sensor 42 indicates that a rearward facing child restraining seat is present and the weight sensor 36 confirms the presence of a child restraining seat, the enable function 68 provides a digital LOW signal to ANDING function 72. The LOW signal from enable function 68 prevents energization of squib 28. When the air bag is disabled, the controller 22 provides an electric signal to indicator 74 to alert the vehicle occupants that the air bag assembly 25 is disabled.

Figure 3:
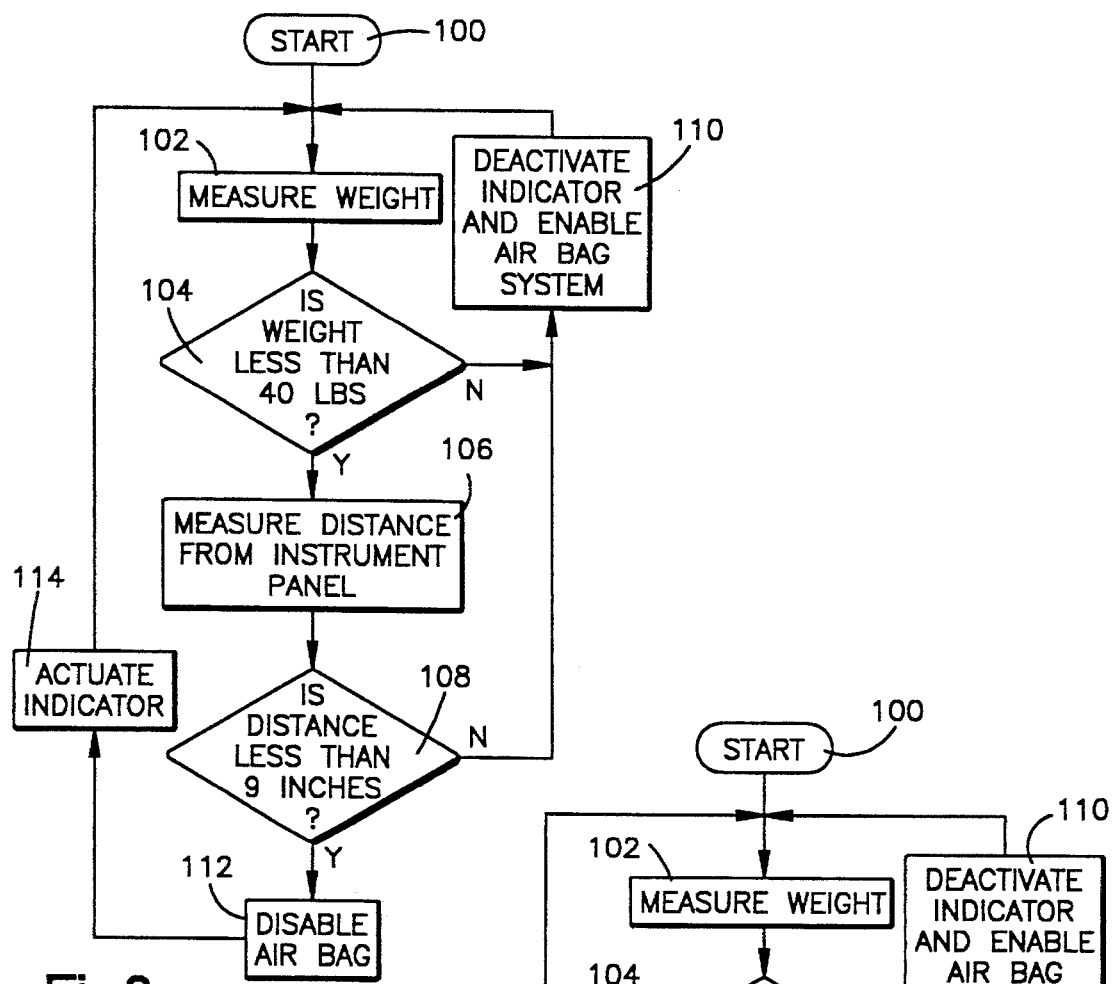
FIGS. 3–5 are flow charts depicting the control process followed by the controller of FIG. 1.

Referring to FIG. 3, the control process of the present invention will be better appreciated. In step 100, the control process is initialized by the controller 22 setting the enable function 68 to a default state providing a digital HIGH signal so as to enable the air bag system and deactuating indicator 74. In step 102, weight sensor 36 measures the weight of an object on occupant seat 40 and provides an electric signal indicative of weight to controller 22. The process proceeds to step 104 where controller 22 determines whether the electrical signal provided by weight sensor 36 indicates a weight less than 40 lbs. If the determination in step 104 is affirmative, i.e., less than 40 lbs., the process proceeds to step 106.

In step 106, the distance sensor 42 measures the distance between an object on occupant seat 40 and distance sensor 42 and provides an electrical signal to controller 22 indicative of the measured distance. In step 108, controller 22 determines whether the electrical signal provided by distance sensor 42 indicates an object is at a distance of less than nine inches from sensor 42. If the determination in step 108 is affirmative, the process proceeds to step 112 where the controller 22 disables the air bag actuation circuit 24. The process then proceeds to step 114 where indicator 74 is actuated to alert the vehicle occupants that the passenger air bag restraint system is disabled. From step 114, the process returns to step 102. From a negative determination in either step 104 or in step 108, the process proceeds to step 110 where the indicator 60 is deactuated (or remains deactuated) and the air bag system is enabled (or remains enabled). From step 110, the process returns to step 102. It will be appreciated by those skilled in the art that the control process repeats and evaluates the sensor signals continuously. Also, the order of steps 104 and 108 may be reversed.

Figure 4:
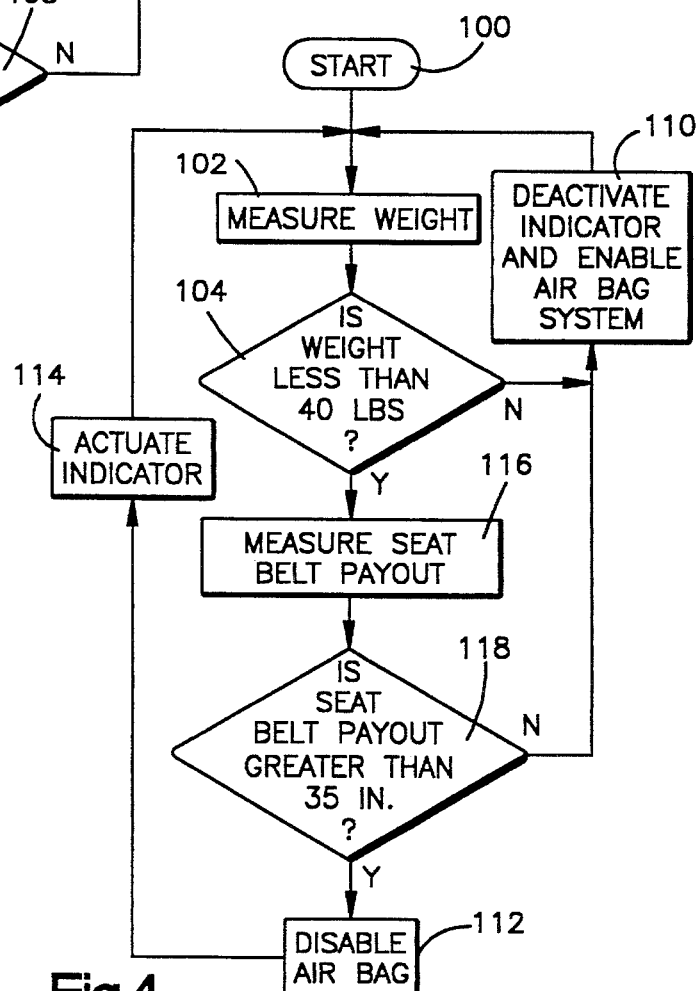

FIG. 4 illustrates another control process in accordance with the present invention. As in the control process of FIG. 3, in step 100, the enable function 68 is set to its default state providing a digital HIGH signal to enable the air bag system and the indicator 74 is deactuated. In step 102, weight sensor 36 measures the weight of an object on occupant seat 40 and provides an electric signal indicative of weight to controller 22. The process proceeds to step 104 where controller 22 determines whether the electrical signal provided by weight sensor 36 indicates a weight less than 40 lbs. If the determination in step 104 is affirmative, i.e., less than 40 lbs., the process proceeds to step 116.

In step 116, seat belt payout sensor 66 provides controller 22 with an electrical signal indicating the length of seat belt 48 extended from seat belt retractor assembly 58. The process then proceeds to step 118 where controller 22 determines whether the length of seat belt 48 extracted is greater than 35 inches. If the determination in step 118 is affirmative, the process proceeds to step 112 where the controller 22 disables the air bag actuation circuit 24. The process proceeds from step 112 to step 114 where indicator 74 is actuated to alert the vehicle occupants that the passenger air bag restraint system is disabled. The process returns from step 114 to step 102. From a negative determination in either step 104 or step 118, the process proceeds to step 110 where the indicator 74 is deactuated (or remains deactuated) and the air bag system is enabled (or remains enabled). From step 110, the process returns to step 102. It will be appreciated by those skilled in the art that the control process repeats and evaluates the sensor signals continuously. Also, the order of steps 104 and 118 may be reversed.

Figure 5:
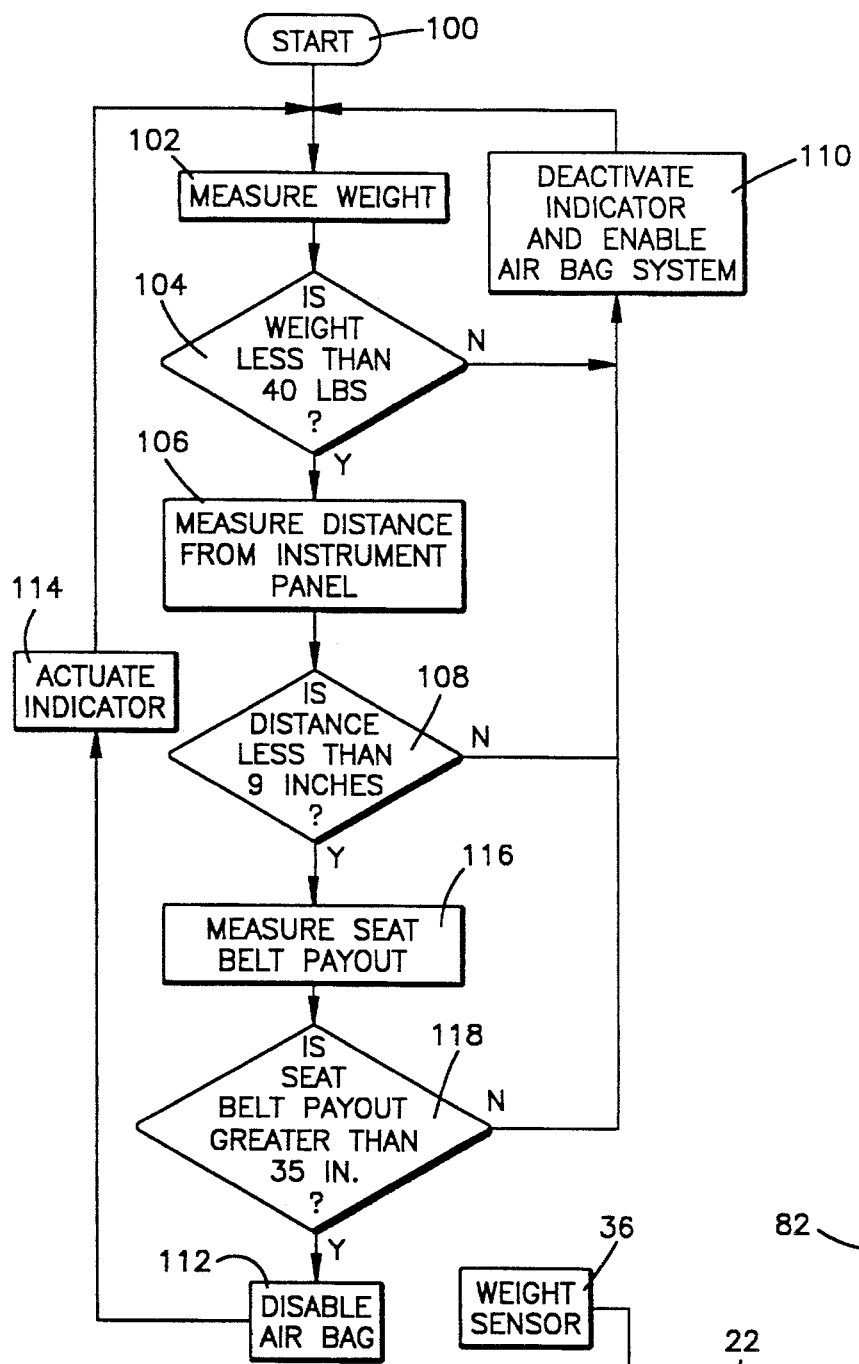

Referring to FIG. 5, yet another control process in accordance with the present invention is shown. As above, in step 100, the enable function 68 is set to its default state providing a digital HIGH signal to enable the air bag system and indicator 74 is deactuated. In step 102, weight sensor 36 measures the weight of an object on occupant seat 40 and provides an electrical signal indicative of weight to controller 22. The process proceeds to step 104 where controller 22 determines whether the electrical signal provided by weight sensor 36 indicates a weight less than 40 lbs. If the determination in step 104 is affirmative, i.e., less than 40 lbs., the process proceeds to step 106.

In step 106, the distance sensor 42 measures the distance between an object on occupant seat 40 and distance sensor 42. An electrical signal is provided to controller 22 indicative of the measured distance. The process thus proceeds to step 108. In step 108, controller 22 determines whether the electrical signal provided by distance sensor 42 indicates a distance less than nine inches. If the determination is affirmative, the process proceeds to step 116.

In step 116, seat belt payout sensor 66 provides controller 22 with an electrical signal indicating the length of seat belt 48 extended from seat belt retractor assembly 58. The process then proceeds to step 118 where controller 22 determines whether the length of seat belt 48 extended is greater than 35 inches. If the determination is affirmative, the process proceeds to step 112 where the controller 22 disables the air bag actuation circuit 24. The process then proceeds from step 112 to step 114 where indicator 74 is actuated to alert the vehicle occupants that the passenger air bag restraint system is disabled. The process returns from step 114 to step 102. From a negative determination in any of steps 104, 108, or 118, the process proceeds to step 110 where indicator 74 is deactuated (or remains deactuated) and the air bag system is enabled (or remains enabled). The process returns from step 110 to step 102. It will be appreciated by those skilled in the art that the control process repeats and evaluates the sensor signals continuously. Also, the order of steps 104, 108 and 118 may be different from that shown and described.

Figure 6:
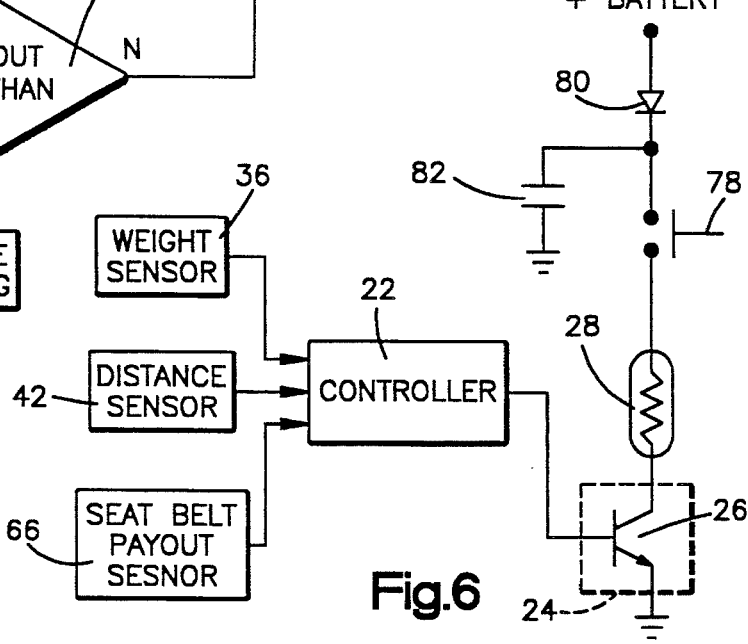
FIG. 6 is a schematic block diagram showing another embodiment of a portion of the circuitry of FIG. 1.

Referring to FIG. 6, an alternate embodiment of the present invention is shown. The squib 28 is connected in series with transistor 26, an inertia switch 78, and diode 80 across a source of electrical energy. This forms a series connected firing circuit. A storage capacitor 82 is connected to the cathode side of diode 80, as is known in the art, to provide a back-up energy source. During a crash event of sufficient intensity, inertia switch 78 will close. The controller 22 is operatively connected to weight sensor 36, distance sensor 42 and seat belt payout sensor 66 as described above. Sensors 36, 42 and 66 provide electrical signals to controller 22. The controller 22 determines whether there is a rearward facing child restraining seat 46 on occupant seat 40 as described above. If the determination is affirmative, controller 22 prevents actuation of the transistor 26 thereby preventing completion of the firing circuit even if the inertia switch 78 closes. If no rearward facing child seat is sensed, the controller 22 provides a control signal to turn transistor 26 ON. When transistor 26 is ON and inertia switch 78 closes, the squib 28 is ignited resulting in deployment of the air bag.

It should be appreciated by those skilled in the art that the distance sensor 42 and/or the belt payout sensor 66 function affirmatively to sense the presence of a rearward facing child restraining set. The weight sensor functions as a confirmation sensor to confirm the presence of a child restraining seat on the occupant seat. Assume an occupant (an adult) is on the occupant seat holding a newspaper within 9 inches of the distance sensor. Since the adult would weigh more than 40 lbs. the weight sensor would not provide the confirmation needed to indicate a rearward facing child seat. Assume that a very large adult is on the occupant seat and extends the seat belt 35 inches. The large adult would weigh more than 40 lbs. Therefore, the weight sensor would not provide the confirmation needed to disable the air bag system.

From the above description of the invention, those skilled in the art will perceive improvements, changes and modifications. For example, the threshold weight value of 40 lbs. and the threshold sensed distance value of 9 in. could vary depending upon the requirements of the vehicle manufacturer and the configuration of the interior of the particular vehicle in which the invention is used. Such improvements, changes and modifications are intended to be covered by the appended claims.

Having described the invention, the following is claimed:

1. An apparatus for preventing actuation of an actuatable occupant restraining device of a vehicle, said apparatus comprising:

presence sensing means for sensing the presence of a rearward facing child restraining seat on an occupant seat of the vehicle and for providing a presence signal indicative thereof;

confirmation sensing means for confirming the presence of said child restraining seat on said occupant seat and for providing a confirmation signal indicative thereof; and control means operatively connected to said presence sensing means, said confirmation sensing means, and to said actuatable occupant restraining device for preventing actuation of said actuatable occupant restraining device when both said presence signal indicates said rearward facing child restraining seat is on said occupant seat and said signal from said confirmation sensing means confirms said child restraining seat is on said occupant seat.

2. The apparatus of claim 1 wherein said confirmation sensing means includes weight sensing means for sensing weight on said occupant seat and for providing said confirmation signal indicative of said child restraining seat being on said occupant seat when the weight on said occupant seat is less than a weight threshold value.

3. The apparatus of claim 2 wherein said presence sensing means includes distance sensing means mounted to an instrument panel of the vehicle for providing a signal indicative of the distance between said distance sensing means and an object on said occupant seat, said presence signal being provided when said sensed distance is less than or equal to a distance threshold value.

4. The apparatus of claim 3 wherein said distance sensing means is an ultrasonic sensor.

5. The apparatus of claim 2 wherein said presence sensing means includes seat belt payout sensing means operatively connected to a seat belt retractor of a seat belt used to secure said child restraining seat to said occupant seat for providing a signal indicative of a length of said seat belt extended from said retractor, said presence signal being provided when said extended length is greater than or equal to a length threshold value.

6. The apparatus of claim 1 wherein said presence sensing means includes distance sensing means mounted to an instrument panel of the vehicle for providing a signal indicative of the distance between said distance sensing means and an object on said occupant seat, said presence signal being provided when said sensed distance is less than or equal to a distance threshold.

7. The apparatus of claim 1 wherein said presence sensing means includes seat belt payout sensing means operatively connected to a seat belt retractor of a seat belt used to secure said child restraining seat to said occupant seat for providing a signal indicative of a length of said seat belt extended from said retractor, said presence signal being provided when said extended length is greater than or equal to a length threshold value.

8. The apparatus of claim 1 wherein said presence sensing means includes distance sensing means mounted to an instrument panel for providing a distance signal indicative of the distance between said distance sensing means and an object on said occupant seat, said presence sensing means further including seat belt payout sensing means operatively connected to a seat belt retractor of a seat belt used to secure said child restraining seat to said occupant seat for providing a seat belt length signal indicative of a length of said seat belt extended from said retractor, said presence signal being provided when both said distance signal indicates a distance less than a first threshold value and said seat belt payout presence signal indicates an extended belt length greater than a second threshold value.

9. The apparatus of claim 8 wherein said confirmation sensing means includes weight sensing means for sensing weight upon said occupant seat and for providing said confirmation signal indicative of said child restraining seat being on said occupant seat when the sensed weight on said occupant seat is less than a weight threshold value.

10. An apparatus for preventing actuation of an actuatable occupant restraining device of a vehicle, said apparatus comprising:

presence sensing means for sensing the presence of a rearward facing child restraining seat on an occupant seat of the vehicle, said presence sensing means including distance sensing means mounted to an instrument panel for providing a distance signal indicative of the distance between said distance sensing means and an object on said occupant seat, said presence sensing means further including a seat belt payout sensing means operatively connected to a seat belt retractor of a seat belt for providing a seat belt length signal indicative of a length of said seat belt extended from said retractor;

confirmation sensing means for confirming the presence of said child restraining seat on said occupant seat and for providing a signal indicative thereof; and control means operatively connected to said presence sensing means, said confirmation sensing means, and to said actuatable occupant restraining device, said control means including means for comparing the sensed distance against a distance threshold value and means for comparing the sensed seat belt length extended against a length threshold value, said control means preventing actuation of said actuatable occupant restraining device when (i) said sensed distance is less than said distance threshold value, (ii) said sensed seat belt length extended is greater than said length threshold value, and (iii) said confirmation sensing means confirms said child restraining seat is on said occupant seat.

11. The apparatus of claim 10 wherein said confirmation sensing means includes weight sensing means for sensing weight on said occupant seat and for providing said confirmation signal indicative of said child restraining seat being on said occupant seat when the weight on said occupant seat is less than a weight threshold value.

12. An apparatus for preventing actuation of an air bag restraint when a rearward facing child restraining seat is present on an associated occupant seat location, said apparatus comprising:

crash sensing means for sensing a vehicle crash condition and providing a signal indicative thereof;

presence sensing means for determining whether said rearward facing child restraining seat is on said occupant seat and for providing a presence signal indicative thereof;

confirmation sensing means for confirming the presence of said child restraining seat on said occupant seat and for providing a confirmation signal indicative thereof; and control means operatively connected to said presence sensing means, said confirmation sensing means, said crash sensing means, and to said air bag restraint for actuating the air bag restraint in response to said crash sensing means unless both (i) said presence signal from said presence sensing means indicates said rearward facing child restraining seat is on said occupant seat and (ii) said confirmation signal from said confirmation sensing means confirms the presence of said child restraining seat on said occupant seat.

13. A method for preventing the actuation of an actuatable occupant restraint device of a vehicle, said method comprising the steps of:

sensing the presence of a rearward facing child restraining seat on an occupant seat of the vehicle and providing a presence signal indicative thereof;

confirming the presence of said child restraining seat on said occupant seat and providing a confirmation signal indicative thereof; and preventing actuation of said actuatable occupant restraining device when said rearward facing child restraining seat is sensed as being present on said occupant seat and the presence of said child restraining seat on said occupant seat is confirmed.

14. The method of claim 13 wherein said step of confirming presence includes the step of sensing the weight upon said occupant seat and providing said confirmation signal when the sensed weight is less than or equal to a weight threshold value.

15. The method of claim 14 wherein said step of sensing presence includes the step of sensing a distance between an instrument panel and an object on the occupant seat and providing said presence signal when the distance between said object on said occupant seat and said instrument panel is less than or equal to a distance threshold value.

16. The method of claim 14 wherein said step of sensing presence includes the step of sensing the length of seat belt extended from a retractor and for providing said presence signal when the sensed extended length of said seat belt extracted from the retractor is greater than a length threshold value.

17. The method of claim 13 wherein said step of sensing presence includes the step of sensing distance between an instrument panel and an object on the occupant seat, and providing said presence signal when the sensed distance is less than or equal to a distance threshold value.

18. The method of claim 13 wherein said step of sensing presence includes the step of sensing seat belt payout and providing said presence signal when the sensed amount of seat belt extracted from a retractor is greater than or equal to a length threshold value.

19. The method of claim 13 wherein said step of sensing presence includes the step of sensing distance between an instrument panel and an object on the occupant seat and sensing seat belt payout, said presence signal being provided when said belt payout is greater than or equal to a length threshold value, and said sensed distance is less than a distance threshold value.

20. The method of claim 19 wherein said step of confirming presence includes sensing weight on said occupant seat and providing said confirmation signal when the sensed weight is less than or equal to a weight threshold value.

* * * * *